Feb. 13, 1934.  J. S. JOHNSON ET AL  1,947,088
ADJUSTABLE AND RELEASABLE PRESSURE GREASE GUN
Filed July 7, 1930  2 Sheets-Sheet 1
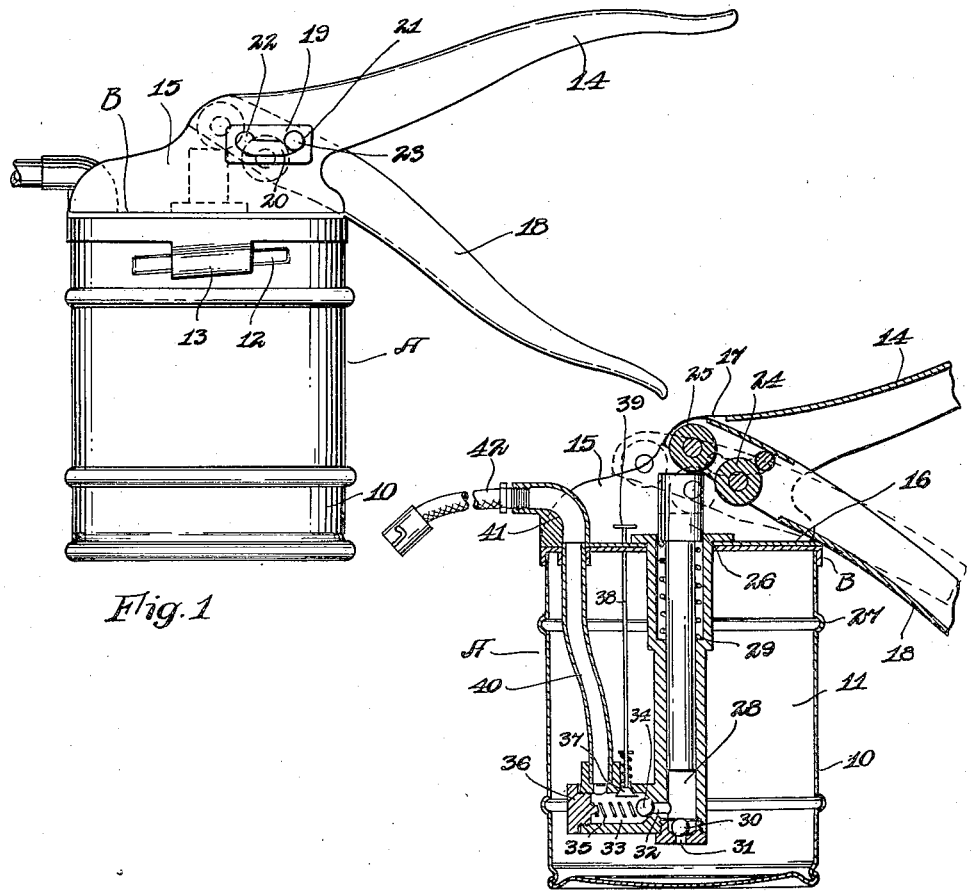
Fig. 1
Fig. 2
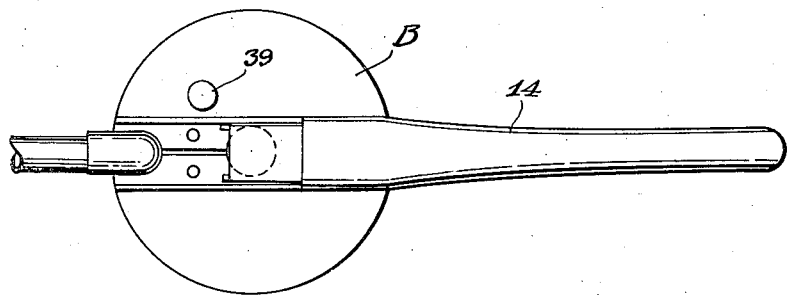
Fig. 3
Inventor
John S. Johnson
August Johnson
By Horan Queler
Attorney Feb. 13, 1934.   J. S. JOHNSON ET AL   1,947,088
ADJUSTABLE AND RELEASABLE PRESSURE GREASE GUN
Filed July 7, 1930   2 Sheets-Sheet 2

Inventor
John S. Johnson
August Johnson
By
Attorney

Patented Feb. 13, 1934

1,947,088

UNITED STATES PATENT OFFICE 1,947,088

ADJUSTABLE AND RELEASABLE PRESSURE GREASE GUN

John S. Johnson and August Johnson, Fargo, N. Dak.; Theodore L. Johnson, administrator of said John S. Johnson, deceased, assignors to Jiffy Lubricator Company Application July 7, 1930. Serial No. 465,807

16 Claims. (Cl. 221—47.3)

This invention relates to pressure grease guns and is designed to provide a grease gun having a container for the grease which may be readily operated by suitable handles closely associated to the grease container to provide a pressure grease gun of a simple compact nature.

A feature of the invention resides in an adjustable means which permits the operator of the gun to adjust the same so as to give an adjustable pressure on the grease being ejected from the gun.

It is also a feature to provide an adjustable, releasable pressure grease gun having means for releasing the pressure in the grease line from the gun in a manner so that the release of the grease in the line is carried directly back into the grease container, and a means for accomplishing the release of the pressure in a simple and effective manner. This structure provides a grease gun of a very desirable nature because it permits the same to be easily disconnected from a joint and overcomes the oozing out of the grease when the connections between the gun the joint being greased are disconnected.

In this grease gun, low and high pressure may be obtained by a simple operation in the shifting of the relation of the operating levers and gun supporting handles. The gun is constructed in a manner so that one of the handles of the gun may extend rigidly with the cover or body of the grease container, while the other handle is shiftable to vary the pressure obtained in the operation of the gun.

Our grease gun further includes a structure wherein all of the parts are of a simple nature, having the valves and pump chamber positioned so as to be contained in the grease chamber of the gun and collectively connected together with the cover so that the operating handles, cover, and pump with the pump chamber and valves and exhaust tube are all collected together removable as a unit and readily replaceable or adjustable to provide a more efficiently operating grease gun in a simple and effective manner.

These features, together with other details and objects of the invention and the peculiar arrangement of the parts with the functions and advantages thereof, will be more fully and clearly set forth in the following specification and claims.

In the drawings forming a part of this specification:

Figure 1 is a side view of our adjustable and releasable pressure grease gun.

Figure 2 is a side sectional view showing a portion thereof broken away.

Figure 3 is a plan view of our grease gun.

Figure 4:
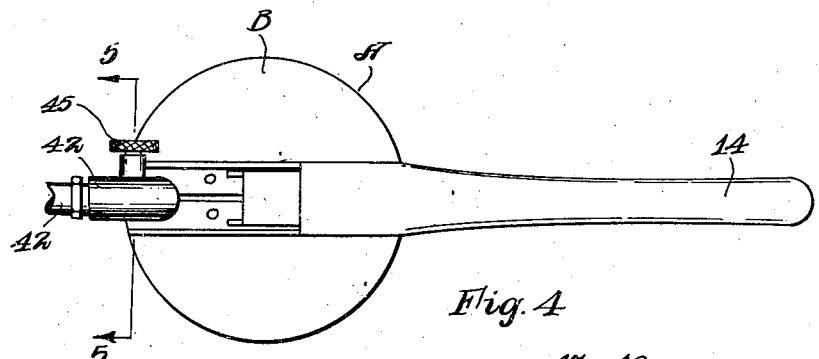
Figure 4 is a detail of another form of our gun.

The grease gun A is provided with a container 10 for grease of the nature desired to be used in the gun and this container can be of a cylindrical formation or any other suitable shape with a grease compartment 11 within the same. The container 10 may be formed with spiral flanges 12 which project from the side of the same, which are adapted to be engaged by the lips 13 formed on the cover B so as to secure the cover B to the container 10 by a rotary or screwing action to tightly lock the cover to the grease container 10.

The cover B is adapted to rigidly support the handle 14 so that this handle may provide a projection from the grease gun A by which it may be carried about. The handle 14 may be formed of sheet-like material being stamped out and formed with side walls or flanges 15 at the forward end which extend across the cover B and are provided with an inwardly turned anchoring portion 16 which is adapted to be secured to the cover B to rigidly attach the handle 14 to the cover. In the formation of the handle 14 out of sheet material in this manner, an opening 17 is formed between the walls 15 at the forward end of the handle 14, and the handle being of a hollow formation provides an opening under the same through which the complemental lever 18 may extend.

The side walls 15 are formed with an embossed portion 19 in which an opening or slot 20 is formed having end notches 21 and 22. Each side wall 15 is formed in this manner. A suitable pin 23 which is carried by the handle 18 extends through the slots 20 in the side walls 15 and supports the handle 18 in operative position in the gun A.

The handle 18 carries two anti-friction rollers 24 and 25 between the side walls of the handle as illustrated in Figure 2 and these rollers are adapted to engage with the head 26 of the pump plunger 27 of the gun A as will be more fully hereinafter set forth.

The pump plunger 27 is supported in the pump chamber 28 which is of a tubular nature and extends down from the cover B between the side walls 15 and is secured to the cover and the flanges 16 to rigidly connect the same together. A suitable coil spring 29 positioned in the upper portion of the plunger chamber 28 operates against the head 26 and normally holds the plunger 27 in upper position. The lower end of the pump chamber 28 is provided with a check valve 30 which closes the intake opening 31 in the valve.

Extending from the pump plunger chamber 28, we provide an outlet passageway 32 which connects with the outlet chamber 33 which projects to one side of the chamber 28. The outlet passageway 32 is closed by the check valve 34 which is operated by the spring 35 and a suitable closure plug 36 holds the spring 35 in operative position. A pressure release valve 37 is positioned in the chamber 33 and is adapted to be operated by the rod 38 which extends up to the operating end 39 which projects above the cover B and which is positioned to one side of the handle member 14.

Leading from the grease outlet chamber 33, we provide an outlet tube 40 which connects with the elbow portion 41 secured to the cover B and is adapted to be connected to a suitable connector 42 of any desirable nature, so as to connect the gun A with the joint to be greased.

In the operation of the gun A, the carrying handle 14 which is rigidly supported to the cover B, provides a means so that the operator can pick up the grease gun A and carry it about. The handle 18 operates by drawing the free end of the same toward the outer end of the handle 14 which reciprocates the plunger 27 and this in turn draws grease into the chamber 28 and passes it on into the ejecting chamber 33. From this chamber, it passes out of the tube 40 and through the connector 42 to the joint to be oiled or greased. The handle 18 is adjustable in a very simple manner. Its operating end extends between the side walls 15 and it is carried in the slots 20 by the pin 23. When the pin 23 is in the rear notches 21 of the slots 20 the roller 25 will engage with the head 26 and the operation of the handle 18 toward the handle 14 will reciprocate the plunger 27 to eject grease from the gun A. This provides what is termed as a low pressure for our gun A. When it is desired to increase the pressure of the grease coming from the gun A, it is only necessary to shift the handle 18 with the supporting pin 23 in the forward or high pressure notches 22, whereupon the roller 24 will engage against the head 26 of the plunger 27 and the fulcrum point of the lever 18 is moved close enough to the operating wheel 24 so as to give a very marked increase in power to the operation of the pump A so that grease may be ejected from the pump A with a very large degree of force.

After the grease has been ejected from the pump A to the joint to be oiled, it is desirable to release the pressure in the line from the pumping mechanism and particularly in the passageway 40, elbow 41 and connector 42, so that when the connector 42 is disconnected from the joint being oiled, the grease will not shoot or ooze out. We accomplish a releasing means in a simple manner by providing the release valve 37 which is operated by simply pressing upon the head 39 permitting the pressure in the line to be directly returned into the body of the gun A within the chamber 11. Thus, any pressure remaining in the ejecting line of the grease gun A may act to return the compressed grease back into the chamber 11 very quickly by simply pressing the head 39 and this also permits the connector 42 to be more easily disconnected from the joint being oiled.

Figure 5:
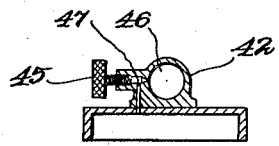
Figure 5 is a section on the line 5—5 of Figure 4.
Figure 6:
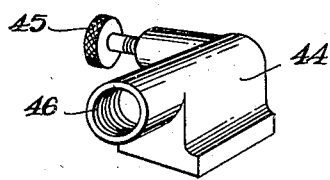
Figure 6 is a detail perspective of a portion of the construction of pump illustrated in Figure 4, showing a form of pressure release for our gun.
Figure 7:
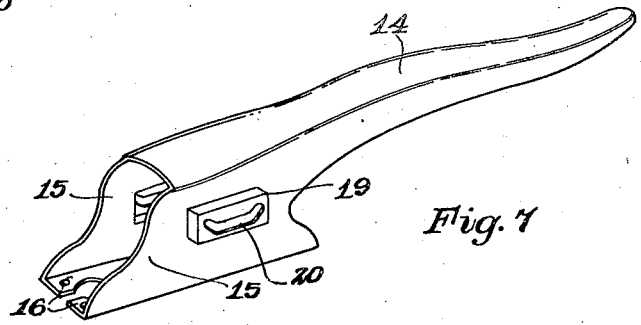
Figure 7 is a perspective view of one of the handles of our gun removed from the cover.

In Figure 5, we have illustrated another form of release in conjunction with our grease gun A and in this construction the connector 42 is connected to the member 44 which takes the place of the elbow 41 and which is secured to the cover B. This connector 44 is provided with a screw release 45 which extends into the passageway 46 in the connector 44 and which is adapted to shut off the by-passageway 47 or to open the same by the operation of the screw 45 so as to return any surplus grease and to relieve the pressure in the grease ejecting line by the operation of the releasing screw 45. Thus, the release screw 45 operates to release the pressure built up in the grease ejecting line of the gun A and the connector such as 42 so that the grease may be directly returned to the chamber 11 and the pressure relieved in the line. The release valve 37 operates somewhat more simple than the screw release 45. The principle is the same in relieving the pressure in the ejecting line of the grease gun A.

The formation of the handle 14 with the simple means of attaching the same rigidly in a bracket formation projecting from the cover B is also important in our pump structure as this construction provides a simple and effective means of supporting the operating handle 18. The positioning of the anti-friction rollers in the handle 18 is also of importance in that it permits free operation of the parts upon which at times an extreme pressure is exerted.

The construction of our grease gun is important in its simplicity, owing to the compact nature thereof and the peculiar arrangement of the operating parts. This construction gives a grease gun having a dual function in providing an adjustable grease ejecting means with high and low pressure, quickly adjusted to the desired pressure and of such a simple nature that it may be easily manufactured at a low cost and yet having a nature to accomplish very desirable results in that it provides either a high or low pressure and that the parts are of a compact nature being arranged as a unit in conjunction with the cover of the grease container.

The simple inexpensive structure of our grease gun permits the garage operator to have several of these grease guns at a low cost for different grades of grease and yet permits the operator to secure a variable pressure which is virtually essential in the successful operation of a grease gun.

In accordance with the patent statutes, we have described the principles of the operation of our grease gun, and while we have set forth a particular formation and arrangement of the parts, we desire to point out that obvious variations and adaptations may be employed within the scope of the following claims in the carrying out of the principles and intent of the grease gun herein set forth.

We claim:

1. An adjustable, releasable pressure grease gun including, a grease receptacle, a cover for said receptacle, a pump having check valves associated therewith carried as a unit by said cover and extending into the lower part of said receptacle, an inlet and an outlet from said pump each open throughout the stroke of the pump in one direction, said check valves positioned in said inlet and outlet, an adjustable operating lever for said pump adapted to be positioned for low and high pressure and anti-friction means on said lever for engagement with said pump.

2. In combination, a grease receptacle, a cover for said receptacle, a pump unit and ejecting means carried by said cover including a plunger, check valves each open throughout the stroke of the plunger in one direction and a grease ejecting chamber, and a reciprocable pressure release valve in said grease ejecting chamber to release the pressure of the grease in said grease ejecting chamber after said pump has ejected grease into the ejecting chamber under heavy pressure.

3. In combination, a grease receptacle, a handle support for said receptacle, a grease pump extending down into said receptacle, a grease ejecting passageway leading from said pump, a normally closed pressure release valve in said ejecting passageway to release the pressure of grease built up in said ejecting passageway and an adjustable pump operating handle adapted to be adjusted for high or low pressure.

4. In combination, a grease receptacle, a grease pump within said receptacle, means for sucking grease into said pump, a passage from said receptacle to said grease sucking means, a check valve in said passage, a grease ejecting passageway adapted to connect said pump with a joint to be greased, and a release valve for releasing the pressure built up in said ejecting passageway in the operation of said pump.

5. In combination, a grease pump for greasing joints, adjustable lever means for operating said pump for high and low pressure, a grease ejecting passageway leading from said pump to a joint to be greased and a pressure release valve in said passageway adapted to release the grease pressure therein directly into said receptacle to relieve grease pressure in the ejecting passageway of said pump.

6. A grease gun including, a receptacle for grease, a pump positioned within said receptacle, a grease ejecting passageway leading from said pump, a connector for connecting said passageway with a joint to be greased, check valve means associated with said pump and receptacle to cause said pump to draw grease into the pumping chamber and eject it into the grease ejecting passageway, lever means for operating said pump including an anti-friction wheel engaging means with said pump lever and an adjustable fulcrum point for said lever to permit said lever to operate for high and low pressure in ejecting grease therefrom.

7. A grease gun including, a grease receptacle, a suction and pressure pump assembly and grease ejecting passageway, means for supporting said pump assembly and grease ejecting passageway as a unit, a pressure release valve adapted to release the pressure in the ejecting passageway built up by the pump operating lever, a spring for holding said valve normally closed, an adjustable fulcrum support for said lever, and anti-friction means for connecting said lever with the pump assembly to operate the same.

8. A grease gun comprising, a grease receptacle, a cover for said receptacle, a handle having a bracket adapted to support the same rigidly with said cover, side walls formed in said handle adapted to form a passageway through the same, a handle lever extending through said passageway, a fulcrum pin extending through said handle and adapted to support the same in said side walls, a slot for said fulcrum pin, notches for adjusting said handle and pin into different operative positions and a grease pump plunger adapted to be operated by said handle lever for high and low pressure ejection of grease from said pump.

9. A grease gun including, a grease receptacle, a cover for said receptacle, a pump unit and grease ejecting passageway carried by said cover including, a pump plunger for sucking grease into said unit and for forcing the same from said unit, check valves, a spring closed pressure release valve in said ejecting passageway, and an adjustable plunger operating handle adapted to be adjusted to operate said plunger with more or less force.

10. A grease gun including, a grease receptacle, a grease pump having a plunger and grease ejecting passageway unit supported extending into said grease receptacle, a lever for operating said plunger having an adjustable fulcrum support, and anti-friction roller means for said lever to contact said lever with said plunger.

11. A grease gun including, a suction and pressure pump unit having a plunger and grease ejecting passageway, a lever for operating said plunger of said unit, check valves in the inlet and outlet of said pump unit and a normally closed grease release valve beyond said check valves positioned in said grease ejecting passageway to relieve the pressure of grease in said ejecting passageway back into said grease receiving receptacle.

12. A grease gun including, a receptacle, a cover for said receptacle, a handle for supporting said receptacle extending from said cover having a bracket-like formation with side walls depending from said handle to contact with said cover, a grease pump assembly and ejecting passageway having a plunger, check valves and a grease release valve, an operating lever extending between said walls of said supporting handle, an adjustable pin and slot fulcrum support for said lever to change the fulcrum operation of said lever, and anti-friction rollers adapted to contact with said plunger in the different positions of said operating lever to provide a free operation to said lever under heavy duty of said grease pumping plunger.

13. A grease gun including, a grease pump and ejecting assembly connected together as a unit, a grease receptacle for receiving said unit, a plunger in said unit for pumping grease under heavy pressure out of the ejecting means of said assembly, check valve means, grease pressure releasing means in the ejecting assembly, a pair of operating levers one of which is fixed stationary, and an adjustable fulcrum support for the other of said levers, said adjustable support including notches for holding said fulcrum support in different positions whereby said adjustable lever is adapted to operate the pump plunger with more or less force.

14. A grease gun including, a grease receptacle, a grease pump assembly unit having an ejecting passageway leading therefrom, check valves within said assembly, a plunger for pumping the grease into said ejecting assembly, spring means for holding said plunger in upper position, a bracket lever extending from said receptacle, an operating lever, a series of anti-friction rollers for connecting said operating lever with said plunger, and an adjustable slot and pin fulcrum support in said bracket lever for said operating lever to cause said lever to operate said plunger with more or less force in accordance with the setting of said fulcrum support.

15. A grease gun including, a receptacle for receiving grease and oil, a pump for pumping the oil out of said receptacle, a bracket handle lever extending from said receptacle, an operating lever extending into said bracket lever, slots in said bracket lever, a fulcrum pin carried by said operating lever extending into said slots, said slots being adapted to support said operating lever in different positions to change the fulcrum operating point of said operating lever to operate said grease pump with more or less pressure.

16. A grease pump including, a grease receptacle, a suction and pressure pump and ejecting unit having a plunger, an adjustable operating lever for said plunger to operate the same with more or less pressure, and a normally closed spring urged grease release valve in said unit.

JOHN S. JOHNSON.
AUGUST JOHNSON.